A. S. McDONELL.
Cultivators.

No. 144,346.    Patented Nov. 4, 1873.

Witnesses.
Harry King
W. W. Dodge

Inventor.
A. S. McDonell
By his att'ys
Dodge & Son

UNITED STATES PATENT OFFICE.

ALLAN S. McDONELL, OF OSGOODE TOWNSHIP, CANADA.

IMPROVEMENT IN CULTIVATORS.

Specification forming part of Letters Patent No. 144,346, dated November 4, 1873; application filed June 10, 1873.

*To all whom it may concern:*

Be it known that I, ALLAN SAMUEL MCDONELL, of Osgoode township, in the Province of Ontario and Dominion of Canada, have invented certain Improvements in Cultivators, of which the following is a specification:

The object of my invention is to produce a machine which will effectually eradicate the couch-grass or wheat-grass, and all other noxious weeds, and at the same time pulverize and mellow the earth; and it consists essentially in the combination of a revolving toothed cylinder with stationary teeth and driving mechanism, as hereinafter fully explained.

Figure 1:
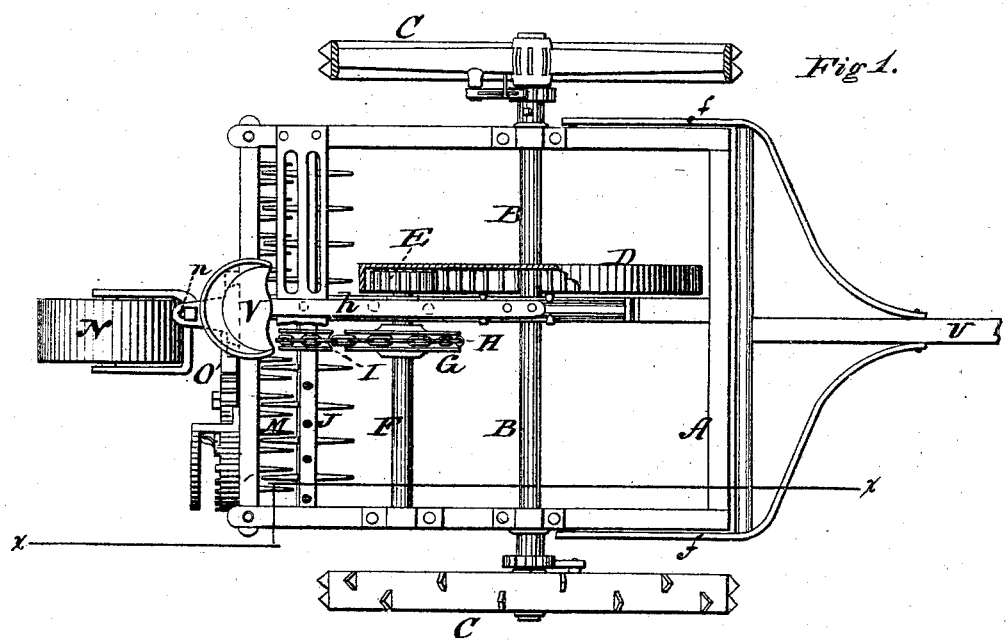
Figure 2:
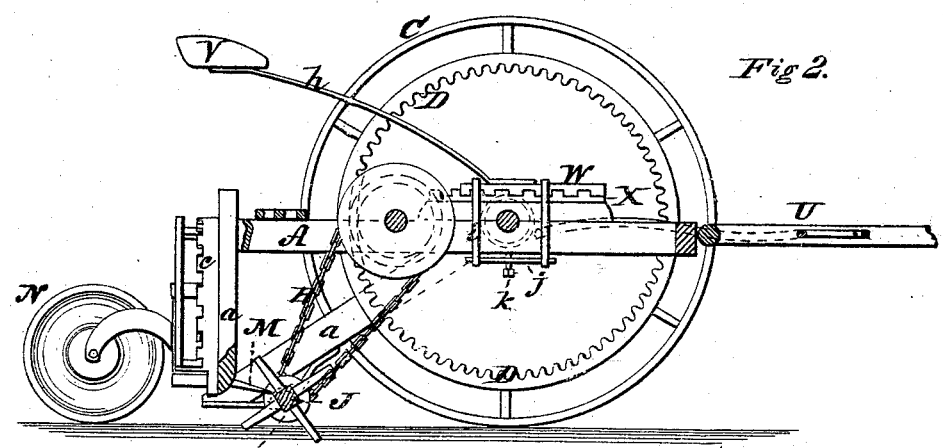

Figure 1 is a top plan view of my machine; Fig. 2, a longitudinal vertical section of the same on the line $x$ $x$ of Fig. 1; and Fig. 3, a rear elevation of the pendent frame.

Figure 3:
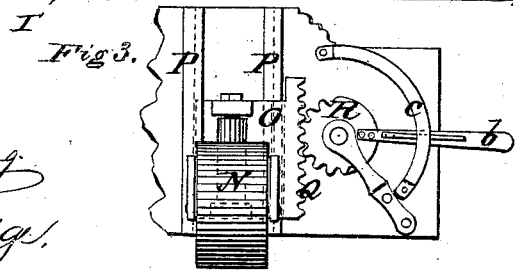

A represents the frame of the machine, made of a rectangular form, and mounted on an axle, B, which has its ends supported in two traction-wheels, C. The axle or shaft B is provided with a gear-wheel, D, which drives a pinion, E, mounted on a transverse shaft, F, which is located in one side of the frame behind the main shaft or axle, as shown in Figs. 1 and 2. The shaft F is provided with a pulley, G, which drives an endless chain, H, which latter drives a pulley, I, mounted on the middle of a revolving toothed cylinder or shaft, J. This cylinder or shaft is mounted in arms or supports $a$, which extend downward from and form a portion of the main frame A, as shown in Fig. 2, the parts being so arranged that the teeth of the cylinder cut into the earth. To the frame, behind the cylinder J, I secure a series of stationary teeth, M, so arranged that the teeth of the cylinder pass upward between them. The depth to which the teeth of the revolving cylinder enter the earth is controlled by a caster-wheel, N, which supports the rear end of the main frame, as shown in Fig. 2. This caster-wheel is not attached directly to the main frame, but to a supplemental frame, O, which slides in guides or ways P secured to the rear end of the main frame, as shown in Fig. 3. The caster-frame O is provided on one side with a rack, Q, and the main frame provided with a pinion, R, which engages in the rack, as shown in Figs. 1 and 3, so that by turning the pinion the caster-wheel can be raised or lowered, and thereby the peneration of the revolving teeth regulated with the utmost nicety. When desired, as in going to and from the field, the caster-wheel may be lowered, so as to hold the revolving teeth entirely clear of the ground. The pinion is provided with and operated by a hand-lever, $b$, which is fastened by a rack-bar, $c$, secured to the main frame, as shown. The tongue or draft pole V, by which the team is attached to the machine, is connected to the frame by two arms, $f$, which are pivoted to the outer sides of the frame, near the main axle, as shown. This arrangement permits the frame to tip or tilt easily, so that the caster-wheel and revolving cylinder can follow all the undulations and inequalities in the surface of the ground, and without changing the line of draft materially. In order to give the caster-wheel greater freedom of movement, the upper end of its pivot is mounted in a slot, $n$, as shown in Fig. 1. A seat, V, for the driver, is mounted on the end of a spring, $h$, which has its forward end attached to the main frame over the main axle. The end of the spring is secured to a plate, W, the under side of which is toothed and mounted on a corresponding toothed plate, X, secured to the frame. The plate W is held down by stirrups $j$, the lower ends of which are fastened to a plate, $k$, which is arranged under the frame and provided with a screw, $l$, which bears against the frame and forces the plate downward. By turning the screw back, the plate $k$ and stirrups $j$ are loosened so as to release the plate W and permit it to be moved forward or back, in order to change the situation of the seat—that is to say, its distance from the axle; and by this means more or less weight can be thrown upon the rear portion of the machine, by which the teeth of the cylinder can be forced more or less into the earth, as circumstances may require, the caster-wheel being adjusted to correspond. The driving or traction wheels C are mounted loosely on the main axle B, but provided with pawls engaging in ratchet-teeth on the axle, as shown in Fig. 1, so that when the wheels are turned backward they do not turn the shaft and gearing.

When in operation, the machine is drawn by either one or two horses, which are driven at a walk. By means of the gearing a rapid rotary motion is imparted to the toothed cylinder, the teeth of which cut backward through the earth and tear up the couch-grass and all other noxious weeds, &c., and carry them up against the stationary teeth M, which cut them in pieces, and destroy their vitality by removing their outer skin or covering. The couch-grass being especially tenacious of life, it is absolutely necessary to tear, abrade, and remove the soft velvety skin therefrom. This is accomplished in a very thorough and rapid manner by the joint action of the revolving and the stationary teeth. The revolving teeth not only tear up and destroy weeds, &c., but also break up and pulverize the earth, and reduce it to a uniform mellow condition.

Having thus described my invention, what I claim is—

1. A cultivator having its frame A mounted centrally on two wheels, with an adjustable caster-wheel, N, supporting its rear end, and having the rotating toothed cylinder J suspended in bearings from the rear end of said frame, in combination with the fixed teeth, all constructed and arranged to operate substantially as described.

2. In combination with the frame A having the cylinder J and teeth arranged to operate as described, the adjustable seat V, and the tongue hinged to the frame at or near its center, whereby more or less weight can be applied to the cylinder, and the frame with its attachments be left free to follow the undulations of the surface, as set forth.

A. S. McDONELL.

Witnesses:
T. G. COURSOLLES,
E. BLAIN DE ST. AUBIN.